United States Patent [19]

Hiestand et al.

[11] Patent Number: 5,269,345
[45] Date of Patent: Dec. 14, 1993

[54] DEVICE FOR TRANSMITTING A PRESSURE MEDIUM

[75] Inventors: Karl Hiestand; Thomas Hiestand, both of Pfullendorf, Fed. Rep. of Germany

[73] Assignee: SMW Schneider & Weisshaupt GmbH, Meckenbeuren, Fed. Rep. of Germany

[21] Appl. No.: 916,020

[22] Filed: Jul. 17, 1992

[30] Foreign Application Priority Data

Jul. 20, 1991 [DE] Fed. Rep. of Germany ....... 4124153

[51] Int. Cl.⁵ .......................... F16L 27/00; F16J 15/40
[52] U.S. Cl. ......................................... 137/580; 277/3; 277/27
[58] Field of Search .............. 137/580, 355.26, 355.27; 277/3, 17, 27, 29, 71, 81 R; 285/134, 136

[56] References Cited

U.S. PATENT DOCUMENTS

| | | | |
|---|---|---|---|
| 4,108,294 | 8/1978 | Stewart et al. | 137/580 |
| 4,174,843 | 11/1979 | Arena et al. | 277/3 |
| 4,647,076 | 3/1987 | Pollack et al. | 277/3 X |
| 4,844,124 | 7/1989 | Stich et al. | 137/580 |
| 5,065,792 | 11/1991 | Ohta et al. | 137/580 |
| 5,188,146 | 2/1993 | Cook, Jr. et al. | 137/580 |

Primary Examiner—John Rivell
Attorney, Agent, or Firm—Robert W. Becker & Associates

[57] ABSTRACT

A device for transferring a pressure medium has a first stationary component and a second component that is inserted into the first stationary component such that it is rotatably drivable therein. A first annular chamber is defined between the first stationary component and the second component and has a first and a second axial end. The first axial end is delimited at least partially by the first stationary component and the second axial end is delimited at least partially by the second component. An inlet line and an outlet line are connected to the first annular chamber. The outlet line guides the pressure medium to a consuming device. Radially extending sealing slots are defined between the first stationary component and the second component at the first and the second axial ends whereby the sealing slots have adjustable slot widths. The first and the second sealing slots are simultaneously adjustable into a same direction with respect to the slot width by an axial relative adjusting movement of the first stationary component and the second component.

39 Claims, 9 Drawing Sheets

# DEVICE FOR TRANSMITTING A PRESSURE MEDIUM

BACKGROUND OF THE INVENTION

The present invention relates to a device for transferring a medium from a stationary first component into a second component which is rotatably driven within the first component. Between the two components an annular chamber is provided, to which are connected an inlet line and an outlet line for guiding the medium to a consuming device. On either side of the annular chamber a radially extending sealing slot is provided. The device is especially suitable for transferring a pressure medium from a rotary distributor to a hollow clamping cylinder.

With pressure medium devices of the aforementioned kind (double acting slide ring sealings of the Busak and Luyken company), the sealing slots, in order to minimize the outflow of pressure medium between the first and second components that are rotatable relative to one another, are enclosed on the one hand by the stationary component and on the other hand by separate metallic sealing rings which are pressed onto the stationary component by the force of springs.

In this manner a slide ring sealing is produced; however, the width of the sealing slot is not adjustable in order to allow for the dissipation of heat energy generated by the two components that are rubbing on one another by removal of a certain amount of the medium to be transferred. It is therefore in general necessary to provide a special cooling medium circuit in order to prevent overheating of the device, especially at higher relative revolutions. However, dry operation and the resulting effects may not be entirely prevented. It is furthermore disadvantageous in this prior art embodiment that the two sealing rings are not coupled with one another and are individually pressed against the stationary component. Different amounts of the medium to be transferred may thus flow via the two sealing slots. Despite the considerable constructive expenditure a satisfactory and reliable pressure medium transfer over an extended period of time may thus not be ensured with the prior art device.

It is therefore an object of the present invention to provide a device for transferring a medium according to the aforementioned kind which not only allows for a reliable transfer of medium, but also in particular ensures that the two sealing slots are simultaneously movable and adjustable and that their slot width may be easily adapted to the respective requirements, preferably automatically. The constructive expenditure for achieving this goal should be minimal so that the device for transferring a medium may be manufactured in an economical manner; however, at all times a high reliability of the transfer of the medium and a long service life should be ensured.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
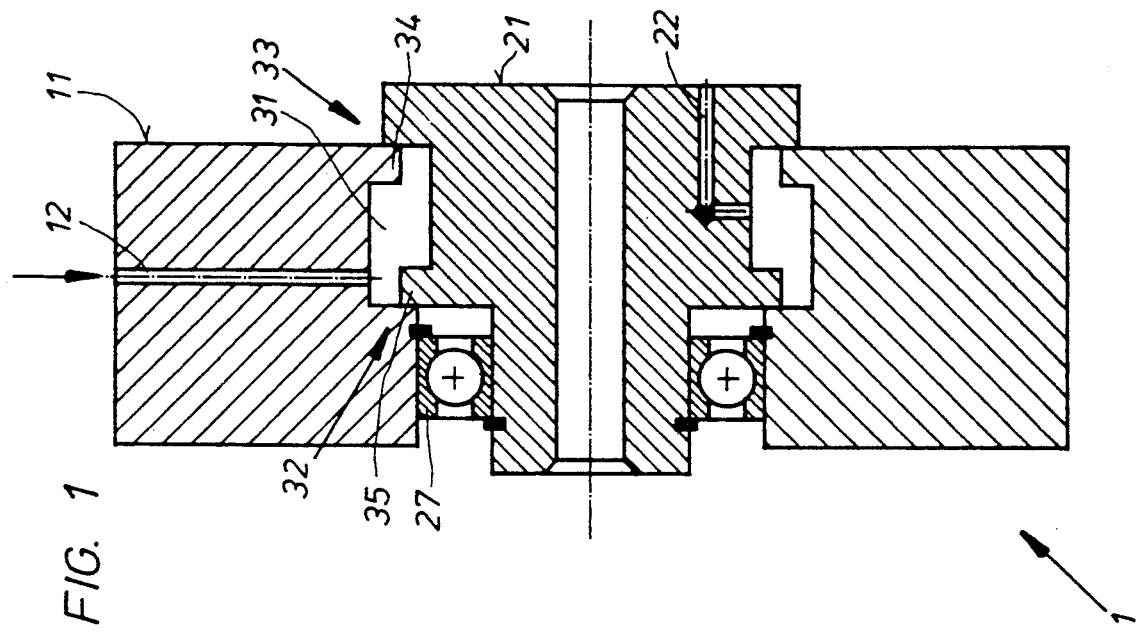
FIGS. 1, 3, 5, 7 show in a schematic representation devices for transferring a medium in slightly varying embodiments.

The device for transmitting a pressure medium is comprised of:

A first stationary component in the form of a rigid constructive unit;

A second component in the form of a rigid constructive unit, the second component inserted into the first stationary component and rotatably drivable relative to said first stationary component, with the pressure medium being transferred from the first stationary component to the second component;

A first annular chamber defined between the first stationary component and the second component, the first annular chamber having a first and a second axial end, the first axial end delimited at least partially by the first stationary component and the second axial end delimited at least partially by the second component;

An inlet line connected to the first annular chamber;

An outlet line connected to the first annular chamber for guiding the pressure medium to a consuming device;

Radially extending sealing slots defined between the first stationary component and the second component at the first and the second axial ends of the first annular chamber, the sealing slots having an adjustable slot width;

A first one of the sealing slots being delimited axially outwardly relative to the first annular chamber by the first stationary component and axially inwardly relative to the annular first chamber by the second component;

A second one of the sealing slots being delimited axially outwardly relative to the first annular chamber by the second component and axially inwardly relative to the first annular chamber by the first stationary component; and The first and the second sealing slots simultaneously adjustable into a same direction with respect to the slot width by an axial relative adjusting movement of the first stationary component and the second component.

Advantageously the device further comprises a control chamber for adjusting the slot width, the control chamber defined between the first stationary component and the second component and having two pressure surfaces arranged opposite one another in the axial direction and loaded by the pressure medium, the control chamber connected with one of the sealing slots to the first annular chamber. Preferably, the control chamber has a third radially extending sealing slot arranged remote from the first annular chamber, the third sealing slot simultaneously adjustable with the first and the second sealing slots. Advantageously, the first stationary component has a radially inwardly extending projection and the second component has a radially outwardly extending projection, the radially inwardly extending projection and the radially outwardly extending projection providing the control chamber with a z-shape. The device preferably further comprises a second outlet line connected to the control chamber and having an adjustable shut-off member.

In another embodiment of the present invention, the device comprises an axially adjustable piston for delimiting the control chamber on a side thereof remote from the first annular chamber, the piston loaded by the pressure medium and adjustable independent of the first stationary component and the second component, and further comprising abutments for limiting the stroke of the piston. Preferably, the second outlet line is in the form of at least one reducing bore extending through the piston, and the piston further comprises a pressure surface facing away from the control chamber and being loaded by the pressure medium.

In a preferred embodiment a second annular chamber is provided, whereby the control chamber is connected to the first annular chamber and the second annular chamber for alternatingly transferring the pressure medium. In this embodiment, the first and the second annular chambers are preferably arranged mirror-symmetrical to one another, or, in an alternative, are arranged in series. Expediently, the first and the second annular chambers have a Z-shape. Advantageously, in all embodiments, the first annular chamber is provided with a Z-shape.

In a preferred embodiment of the present invention, the first stationary component has a radially inwardly extending projection projecting into the first annular chamber and cooperating with the second component to form the second sealing slot. The second component has a radially outwardly extending projection projecting into the first annular chamber and cooperating with the first component to form the first sealing slot. Preferably, at least one of the radially inwardly and the radially outwardly extending projections have a radial prolongation. These prolongations serve to compensate axially oriented forces acting on the two components due to the medium to be transmitted in order to thereby allow an automatic adjustment of the slot width. Advantageously, the radially inwardly and the radially outwardly extending projections together with the radial prolongations respectively have identically dimensioned radial pressure surfaces loaded in the axial direction. The radial pressure surfaces are arranged on a same diameter region of the device as the first and the second sealing slots. However, it is also possible that the first and the second sealing slots have different lengths and are arranged on different diameter regions of the device.

For the automatic adjustment of the slot width of the two sealing slots it is also possible to connect the first stationary component with the second component via a bearing disposed therebetween. In an alternative, at least one of the two components is supported by a spring counteracting the axial relative adjusting movement of the two components relative to one another. For the same purpose, it is however also possible to delimit the axial adjusting movement of the two components relative to one another by abutments.

The limitation of the relative axial adjusting movement with abutments may be accomplished such that a first one of the abutments is a protrusion in the form of a lever or a pin inserted into one of the two components within the first annular chamber and cooperating with a second abutment at the other one of the components.

The second abutment is preferably a projection. It is also possible that the first one of the abutments is a projection connected to one of the two components within the first annular chamber and cooperating with a second one of the abutments at the other one of the two components, the second abutment being a shoulder, whereby the first and the second abutments are spaced from one another at a distance that corresponds to the maximum slot width. The projection may extend radially inwardly or radially outwardly. For generating the axial relative adjusting movement of the two components, the shoulder has a laterally open recess.

For providing a simple manufacture and mounting of the device the first stationary and/or the second component is entirely or at least partially comprised of at least two disks axially adjacent connected to one another in a fixed manner. These disks are preferably connected to one another by screws.

It is furthermore advantageous to provide at least one of the sealing slots of the annular chamber and/or the third sealing slot of the control chamber, at least on one side of the respective sealing slots, with a wear-resistant lining connected to one of the two components. Preferably, the lining is a ring of a ceramic material inserted into the two components.

With a device for transferring a medium according to the present invention, it is possible to adjust the first and second sealing slots simultaneously relative to one another and to adjust the slot width as a function of the respective requirements so that the annular chamber loaded with pressure medium will release through the coordinated sealing slots a defined amount of medium to be transferred. Due to the embodiment of the two components within the area of the annular chamber it is ensured that with an axial relative adjusting movement, resulting from the pressure medium or from a respective control member, the two components may be adjusted relative to one another such that the slot widths are simultaneously adjusted, i.e., simultaneously opened or closed, by the same distance. Since with the aid of the furthermore provided control chamber and/or the dimensioning of the annular chamber, the axially oriented forces can be increased and reduced, the sealing slots may be automatically adjusted.

A metallic rubbing between the two components that rotate relative to one another and thus a possibly resulting overheating is prevented, because a viscous friction results between the two components. Furthermore, the pressure medium exiting in a controlled manner through the sealing slots generates a sufficient cooling effect. Also, dimension tolerances within the area of the sealing slot will be compensated after a short time period because the two components will grind one another and the sealing slots will thus be conformed to one another. When the pressure medium to be transferred contains metallic contaminants, such as cuttings, the sealing slots will opened for a short time period uniformly so that the contaminants or enclosures may be removed without causing any damage. Despite the minimal constructive expenditure—in the simplest embodiment only the two components must be respectively embodied for producing the annular chamber—a very reliable and adaptable transfer of medium over an extended period of time is thus possible which, of course, is also possible when originating from the second component, i.e., flow in both directions.

DESCRIPTION OF PREFERRED EMBODIMENTS

The present invention will now be described in detail with the aid of several specific embodiments utilizing FIGS. 1 through 13.

The different embodiments represented in FIGS. 1 through 8 of the device 1 are designed to transfer a medium from a first stationary component 11 to a second component 21 inserted into the first component 11 and rotatably driven relative to the first stationary component 11. The medium to be transmitted is introduced into the annular chamber 31 via an inlet line 12 provided at the first stationary component 11. An outlet line 22 is machined into the second component 21 and serves to guide the medium to a consuming device not represented in the drawing.

The two components 11 and 21 are supported relative to one another via a roller bearing 27. Adjacent to the annular chamber 31 radially extending first and second sealing slots 32 and 33 are provided the slot width of which is simultaneously adjustable in the same direction, i.e., in an opening or closing direction, due to an axial relative adjusting movement of the two components 11 and 21.

In order to provide this axial adjusting relative movement, the two components 11 and 21 form a closed constructive unit (composite unit). Furthermore, the sealing slot 32 is delimited at its (axially) outer side by the first component 11 and at its (axially) inner side by the second component 21, and the sealing slot 33 is delimited at the (axially) outer side by the second component 21 and at the (axially) inner side by the first component 11. The two components 11 and 21 are provided with integral projections 34 and 35. Due to this embodiment, a simultaneous opening and closing of the sealing slots 32 and 33 is possible.

For an easy assembly of the components 11 and 21, embodied as disclosed above, the components 11 and 21 are comprised of individual disks 13, 14, and 15, respectively, 23, 24, and 25 which are connected to one another by screws 16, respectively, 26 in a rigid manner. The disks 13 and 15 of the first component 11 are provided with receiving chambers 17 and 18 into which the medium exiting through the sealing slots 32 and 33 from the annular chamber 31 is collected. Via lines 19 and 20 this medium may then be recycled into a reservoir.

Figure 2:
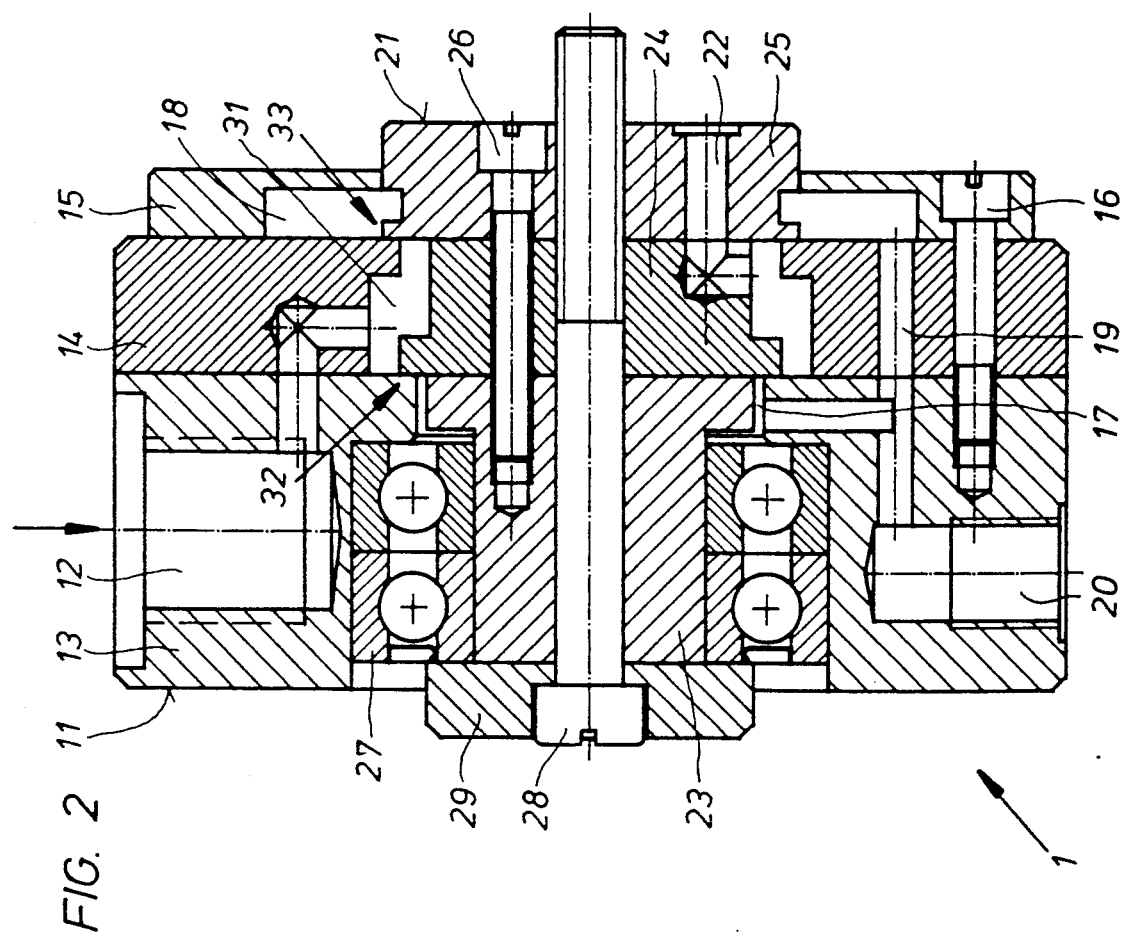
FIGS. 2, 4, 6, 8 show the constructive embodiments of the devices according to FIGS. 1, 3, 5, 7.

According to the embodiment of FIGS. 1 and 2 the surfaces of the two zones of the z-shaped annular chamber 31 machined into the components 11 and 21 and loaded in the axial direction are of identical dimensions so that—in theory—the two components 11 and 21 supported in the axial direction via the bearing 27, when a respective fine machining has been performed, should rest tightly on one another and no medium should be able to exit via the sealing slots 32 and 33. However, in practice it has been proven that the medium within the area of the annular chamber 31 creeps between the two components 11 and 21 so that within the sealing slots 32 and 33 a pressure is generated. As soon as a pressure is generated within the sealing slots 32 and 33 the slots are simultaneously opened and the two components 11 and 21 are moved away from one another in the axial direction.

In order to prevent a complete opening of the sealing slots 32, 33, the two components 11 and 21 are clamped relative to one another via the bearing 27. For this purpose, a screw 28 which is connectable to the consuming device (not represented) is provided for supporting via a disk 29 the bearing 27. The axial adjusting stroke of the two components 11 and 21 relative to one another is thus limited by the play within the bearing 27, and the maximum slot width of the sealing slots 32 and 33 thus corresponds to the play of the bearing 27. Of course, it is also possible that the two components 11 and/or 21 are loaded in an axial direction by a pressure spring in order to counter more or less completely the opening force of the pressure generated within the sealing slots 32 and 33.

For compensating the axially oriented forces generated by the pressure build-up within the sealing slots 32', 33', respectively, 32", 33", respectively, 32''', 33''' entirely or at least partially, the projections 34 and 35, as represented in FIGS. 3 to 8, are provided with differently dimensioned radially extending prolongations 36, 37, respectively, 36', 37', respectively, 36", 37" for thereby establishing additional axially loadable annular surfaces $F_1$, $F_2$, respectively, $F_1'$, $F_2'$, respectively, $F_1''$, $F_2''$. The prolongations 36, 37 or 36', 37' or 36", 37" are indicated by dash-dotted lines in the schematical representation. With the aid of the annular surfaces $F_1$, $F_2$, $F_1'$, $F_2'$, $F_1''$, $F_2''$ varying forces which are oppositely oriented relative to one another may be generated via which the components 11 and 21 may be moved relative to one another such that the slot width of the sealing slots 32', 33', 32"33", 32''', 33''' is respectively enlarged or reduced.

Figure 3:
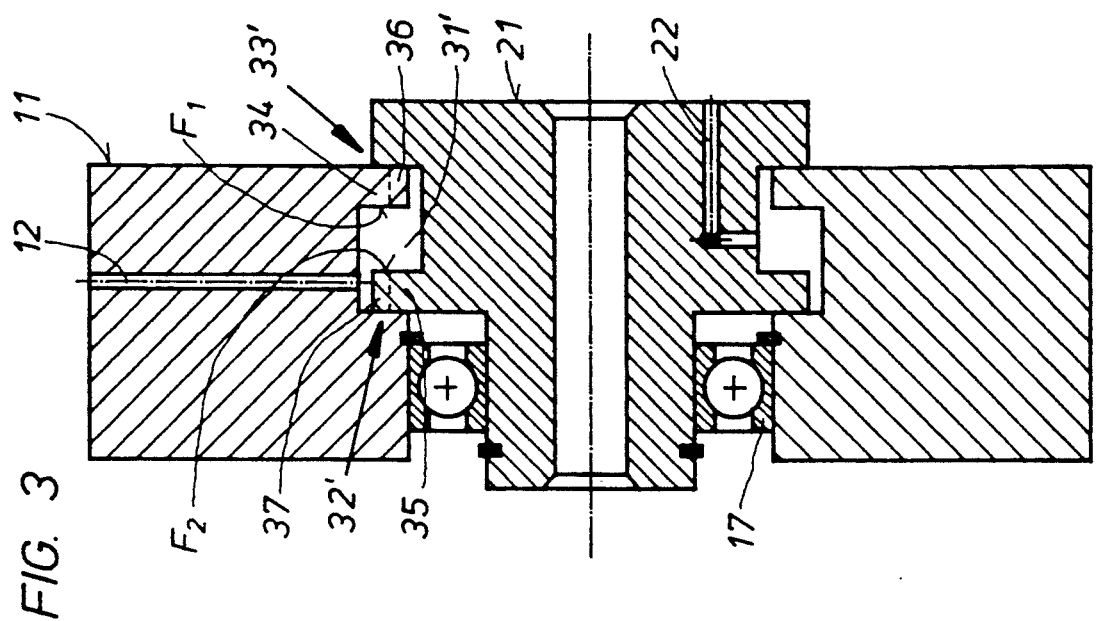
Figure 4:
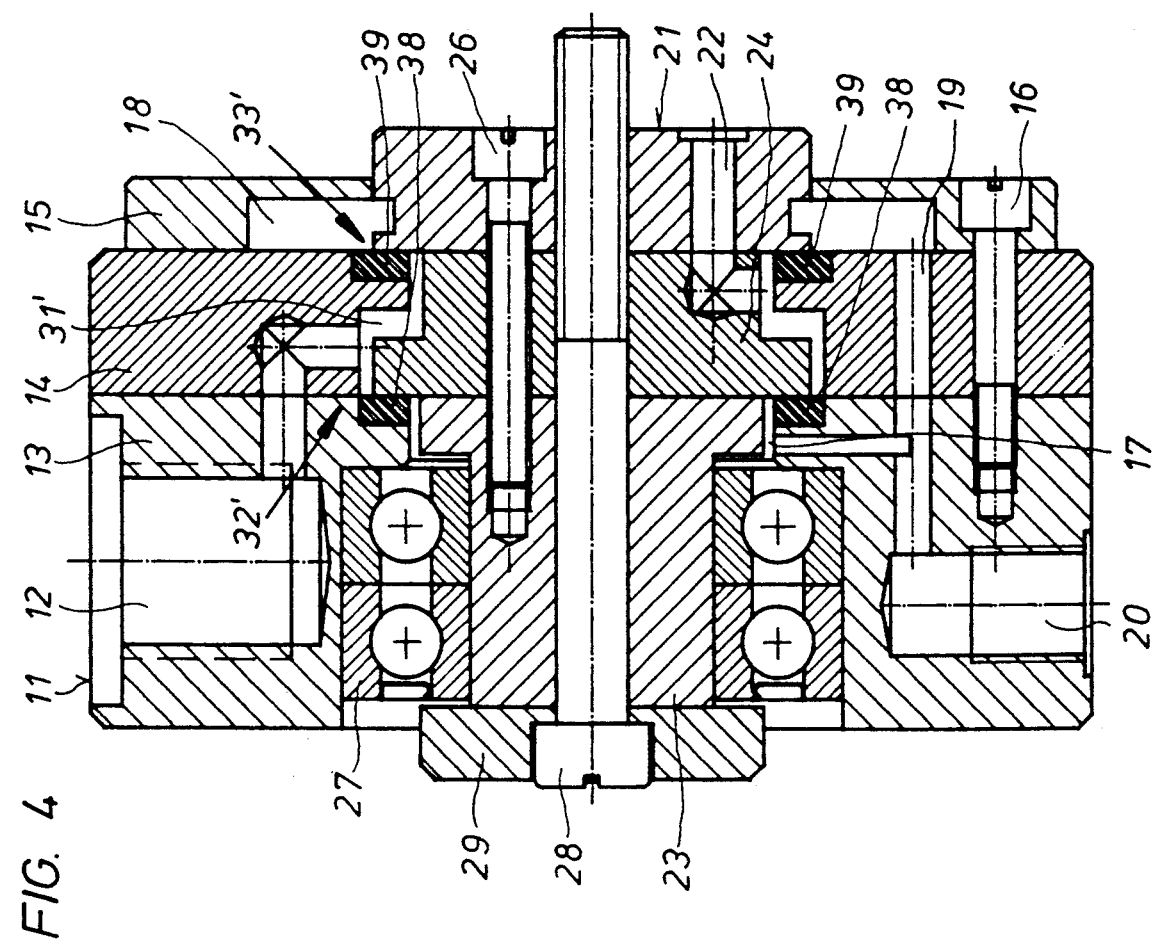

In the embodiment according to FIGS. 3 and 4 the annular surfaces $F_1$ and $F_2$ are identical to the size of the surfaces of the components 11 and 21 delimiting the sealing slots 32' and 33'. The pressure generated within the sealing slots 32' and 33' is thus entirely compensated so that no medium may be leaving the annular chamber 31' in the lateral direction. Furthermore, the disks 13 and 14 have inserted therein rings 38 and 39 made of a ceramic material so that the sealing slots 32' and 33' are delimited on one side by a wear-resistant lining.

Figure 5:
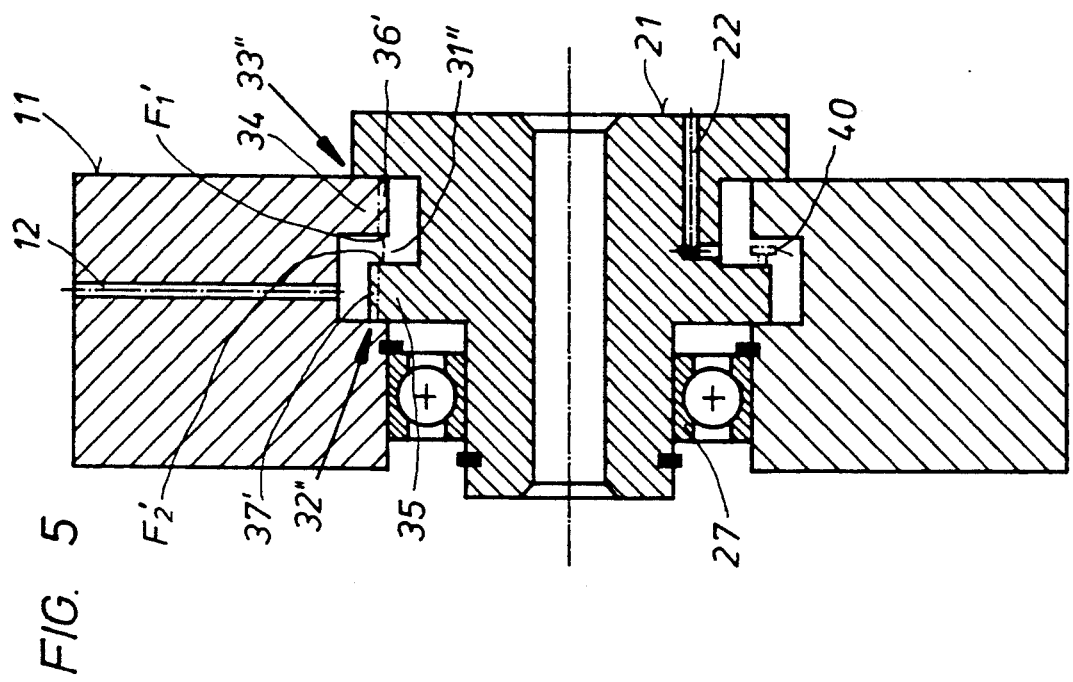
Figure 6:
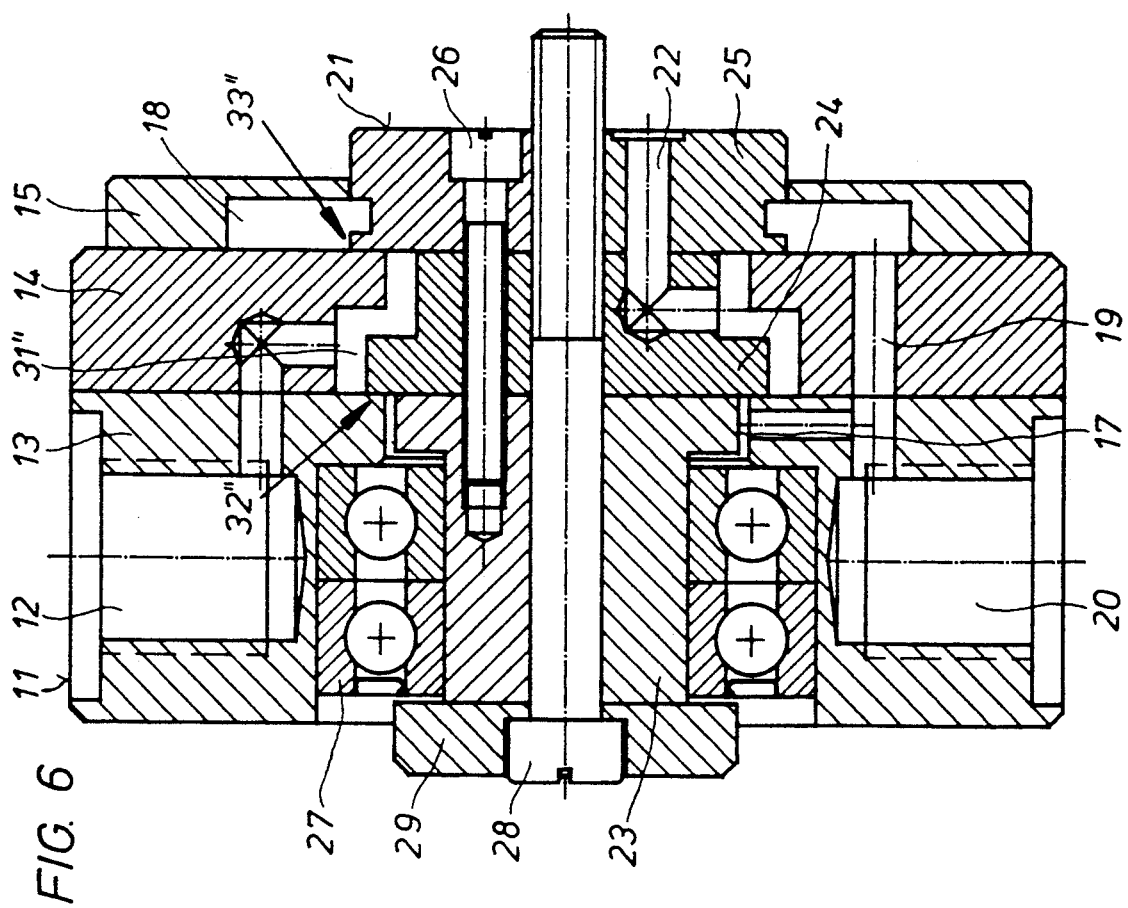

According to FIGS. 5 and 6 the pressure surfaces $F_1'$ and $F_2'$ are smaller than the surface areas of the components 11 and 22 which delimit the sealing slots 32" and 33". The pressure forces generated within the sealing slots 32" and 33" are thus only partially compensated so that in the device according to FIGS. 5 and 6 a defined amount of medium to be transferred is guided laterally away from the annular chamber 31".

In order to be able to maintain a maximum slot width of the sealing slots 32", 33" it is possible, as shown in FIG. 5 in a dash-dotted line, to provide an abutment which may be in the form of a lever 40 inserted into the second component 21 and cooperating with the projection 34 of the first stationary component 11.

Figure 7:
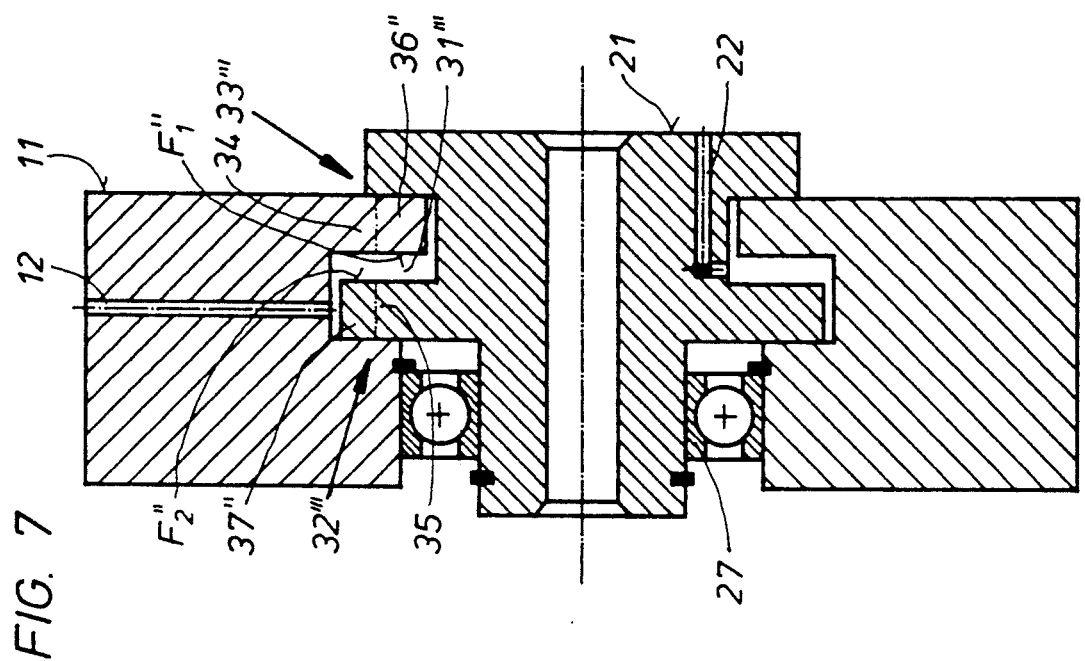
Figure 8:
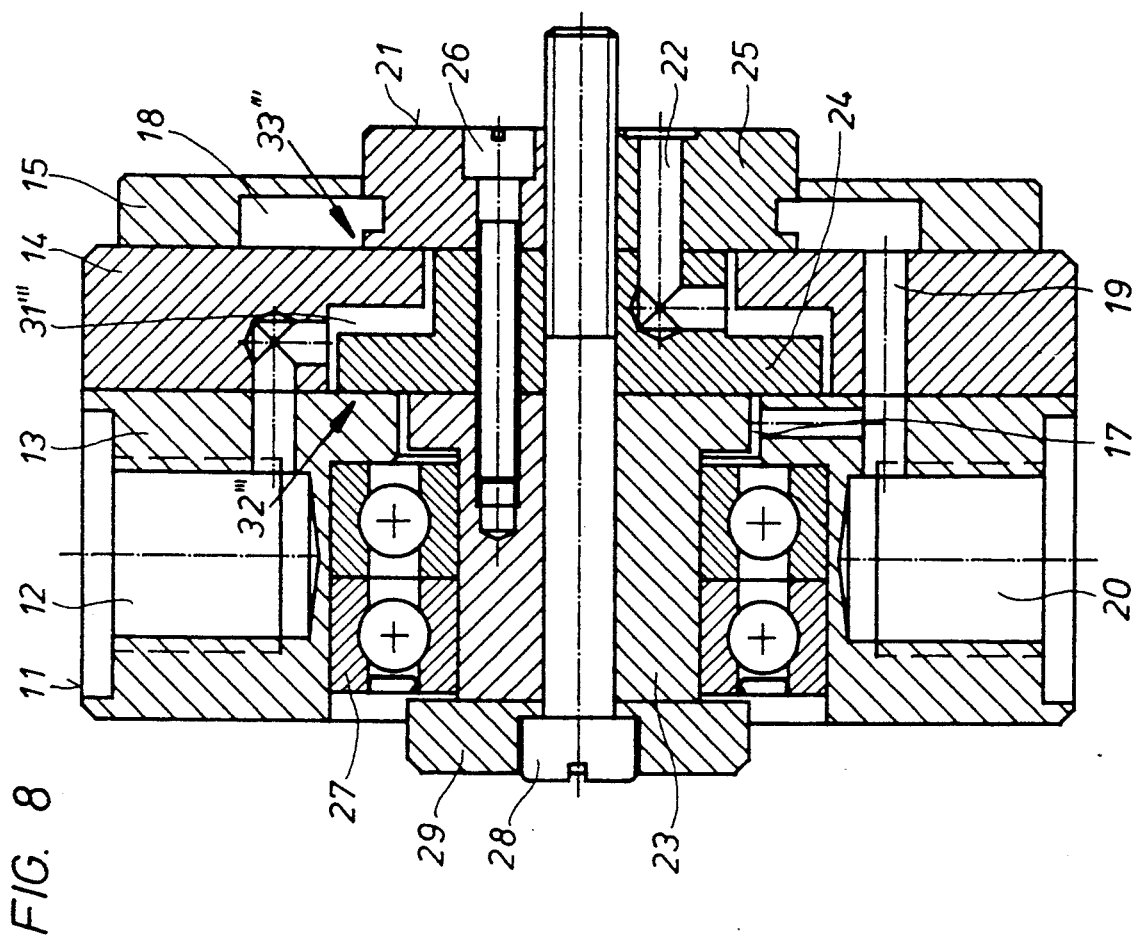

In the embodiment according to FIGS. 7 and 8, the pressure forces generated within the sealing slots 32''' and 33''' are overcompensated so that no medium may exit laterally from the annular chamber 32'''. The annular pressure surfaces $F_1''$ and $F_2''$ are substantially greater than the annular surfaces of the components 11 and 21 delimiting the sealing slots 32''' and 33'''. Accordingly, the axially oriented forces which force the sealing slots 32''' and 33''' apart are greater than the oppositely working pressure forces.

Figure 9A:
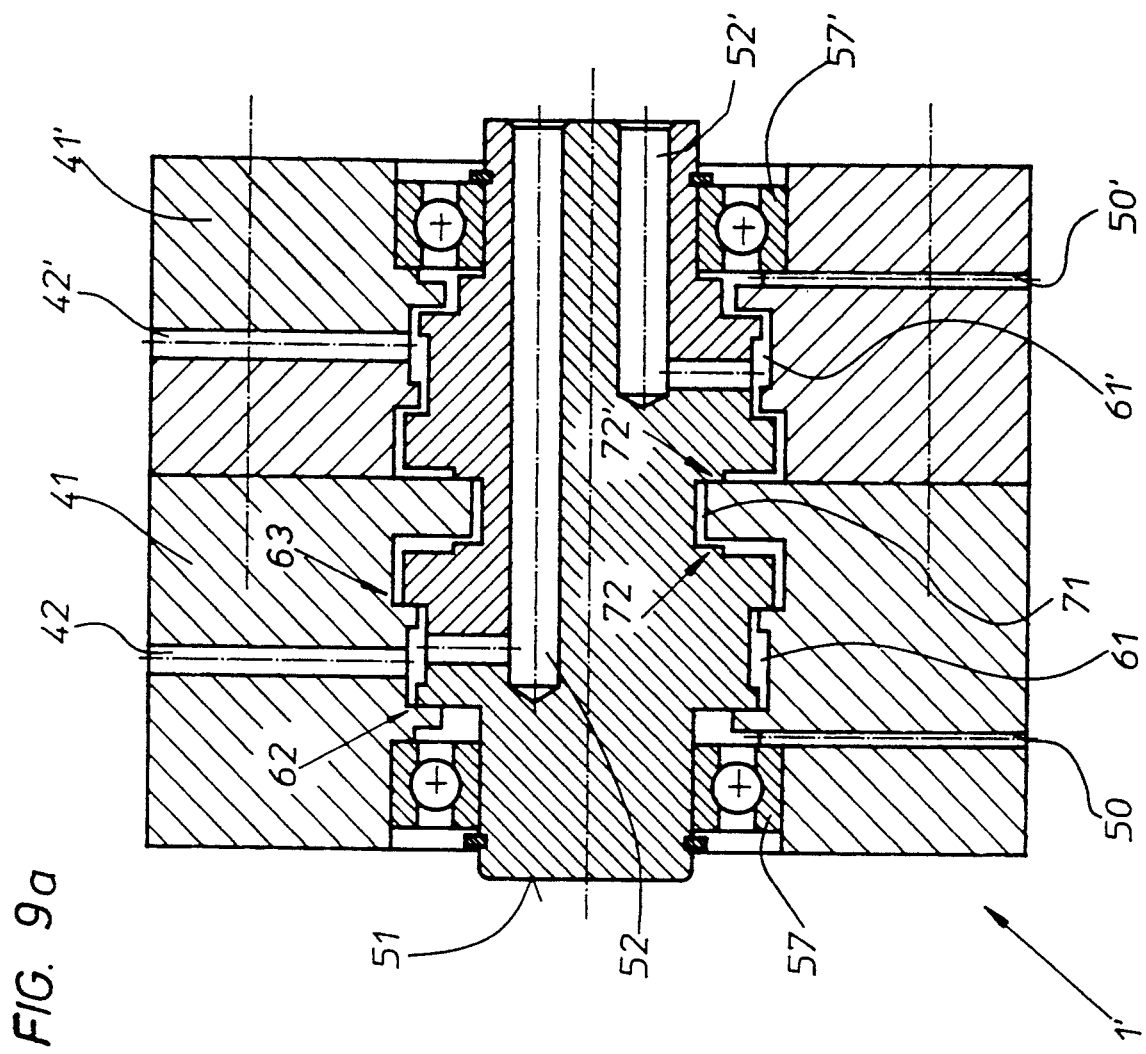
FIGS. 9, 9a, 10 show a device according to FIGS. 1 and 2 with a control chamber coordinated with the annular chamber in a schematic representation and in a constructive embodiment.
Figure 9:
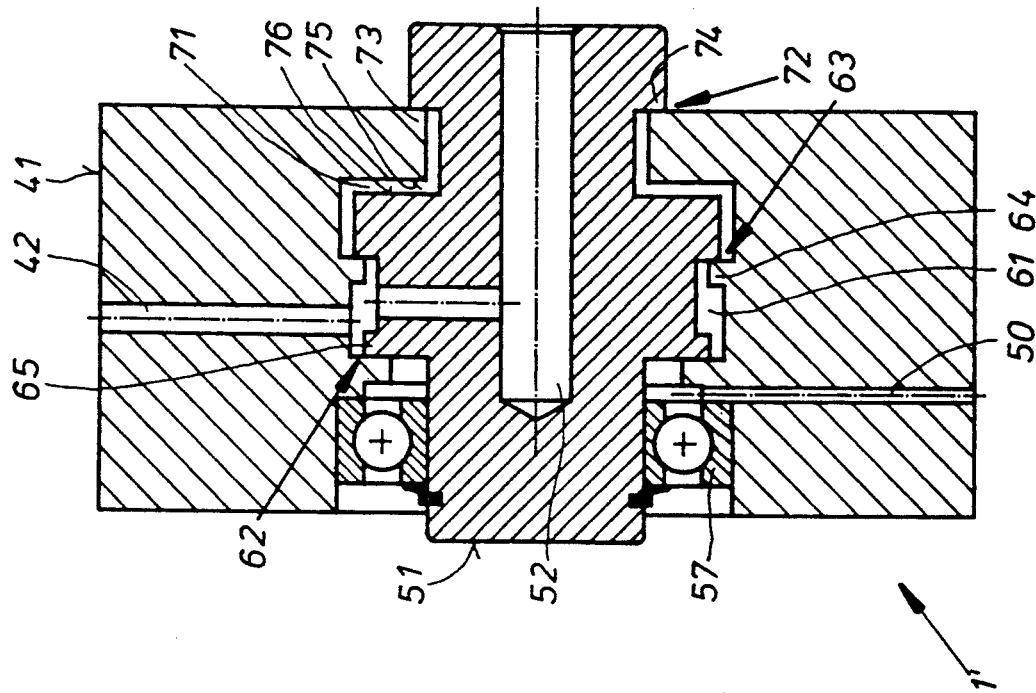
Figure 10:
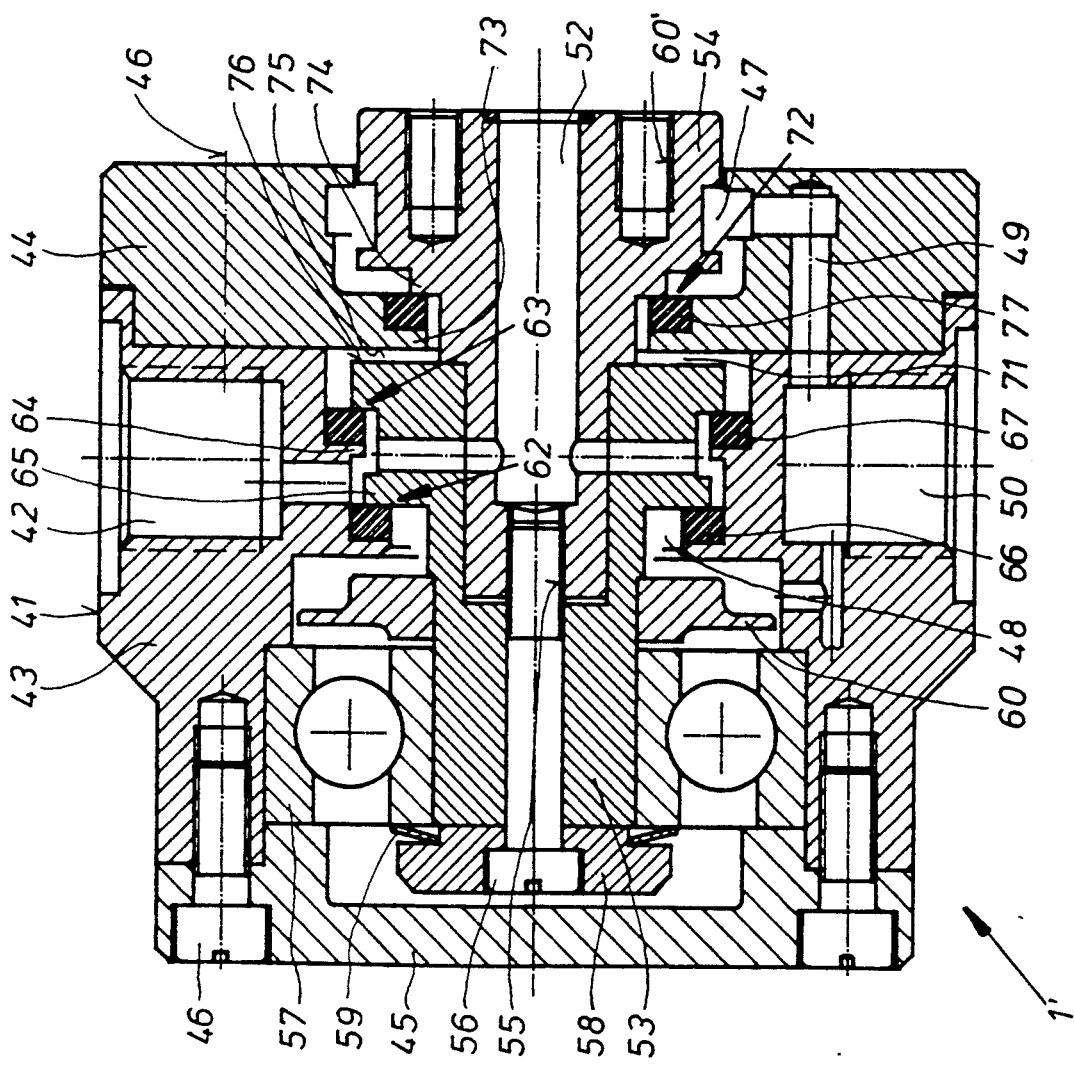

The device 1' shown in FIGS. 9 and 10 is comprised of a first stationary component 41 and a second component 51 which is inserted into the first component 41 in a rotatably drivable manner. Between the two components 41, 51 an annular chamber 61 is provided with a control chamber 71 arranged downstream in order to provide an automatic simultaneous adjustment of the slot width of the sealing slots 62 and 63. Via a line 42 the pressure medium is introduced into the annular chamber 61 from where it is guided via a line 52 to a consuming device.

The first stationary component 41 is comprised of two parts (disks) 43 and 44 as well as a lid 45 which parts are connected by screws 46 in a rigid manner. The second component 51 is also comprised of two parts (disks) 53 and 54 the two parts being connected to one another by a screw 56 which engages a threaded bore 55 machined into the part 54.

A spring 59 is supported via a disk 58 at the screw 56, the spring 59 acting on a bearing 57 via which the two components 41 and 51 are rotatably supported relative to one another and in front of which a splash ring 60 is arranged. The face of the part 54 is provided with threaded bores 60', and with respective screws engaging these threaded bores 60' the device 1' may be connected to a consuming device.

A control chamber 71 is connected to an annular chamber 61 which is identically embodied to the embodiment according to FIGS. 1 and 2, with a sealing slot 63 connecting the annular chamber 61 to the control chamber 71. A further (third) sealing slot 72 serves to close and open the control chamber 71. The sealing slot 72 is simultaneously actuatable with the first and second sealing slots 62 and 63 formed by the radially extending projection 64 and 65.

For this purpose, the components 41 and 51 are each provided with an inwardly extending projection 73, respectively, a radially outwardly extending projection 74 which cooperate with their axially facing areas. Furthermore, the control chamber 71 is provided with two oppositely arranged annular surfaces 75 and 76 which are loaded by the pressure generated within the control chamber 71. Due to the forces acting on the annular surfaces 75 and 76 the components 41 and 51 are forced apart so that the sealing slots 62, 63, and 72 are closed.

When a pressure medium is transferred, the pressure medium exits through the opening sealing slots 62 and 63 and is collected in a receiving chamber 48 as well as in the control chamber 71. In the control chamber 71 a pressure is generated because the sealing slot 72, due to its dimensions, acts as a reducing valve so that the pressure forces acting on the annular surfaces 75 and 76 force the two components 41 and 51 apart and the sealing slots 62, 63, and 72 are again more or less closed. The two components 41 and 52 are thus automatically and continuously adjusted in the axial direction, and the slot width of the sealing slots 62, 63 and 72 is thus self-adjusted. When the sealing slots 62 and 63 are closed, the pressure within the control chamber 71 and thus the counterforce is reduced, so that the sealing slots 62 and 63 are again opened.

The pressure medium exiting through the sealing slot 72 is collected in a chamber 47. Via lines 49 and 50 the pressure medium exiting laterally from the annular chamber 61 is recycled into a reservoir. Furthermore, the sealing slots 62, 63, and 72 are delimited on one side by rings 66, 67, and 77 made of a ceramic material.

FIG. 9a schematically shows in which manner the device 1' according to FIG. 9 is to be supplemented for introducing a pressure medium into a cylinder having inserted therein a piston which may be loaded from both ends by the pressure medium. Mirror-symmetrical to the annular chamber 61 a second annular chamber 61' is arranged so that the control chamber 71 which is enclosed by sealing slots 72 and 72' is located between the two annular chambers 61 and 61'. The exterior component 41, 41' is comprised of two fixedly connected parts (disks) into which the lines 42 and 42' are machined for the alternating introduction of the pressure medium to one of the annular chambers 61, 61'. The component 41, 41' is supported on the component 51 via bearings 57 and 57'. The component 51 is further provided with an outlet line 52' connected to a consuming device.

One of the two components 41, 41', respectively, 51 in this embodiment should be fixedly clamped or fixedly connected, while the other component 51, respectively, 41, 41' should be slightly axially movable for adjusting the annular chambers 61, 61'. The axial relative adjusting movement of the axially movable component is transmitted by the bearings 57, 57'.

Figure 11:
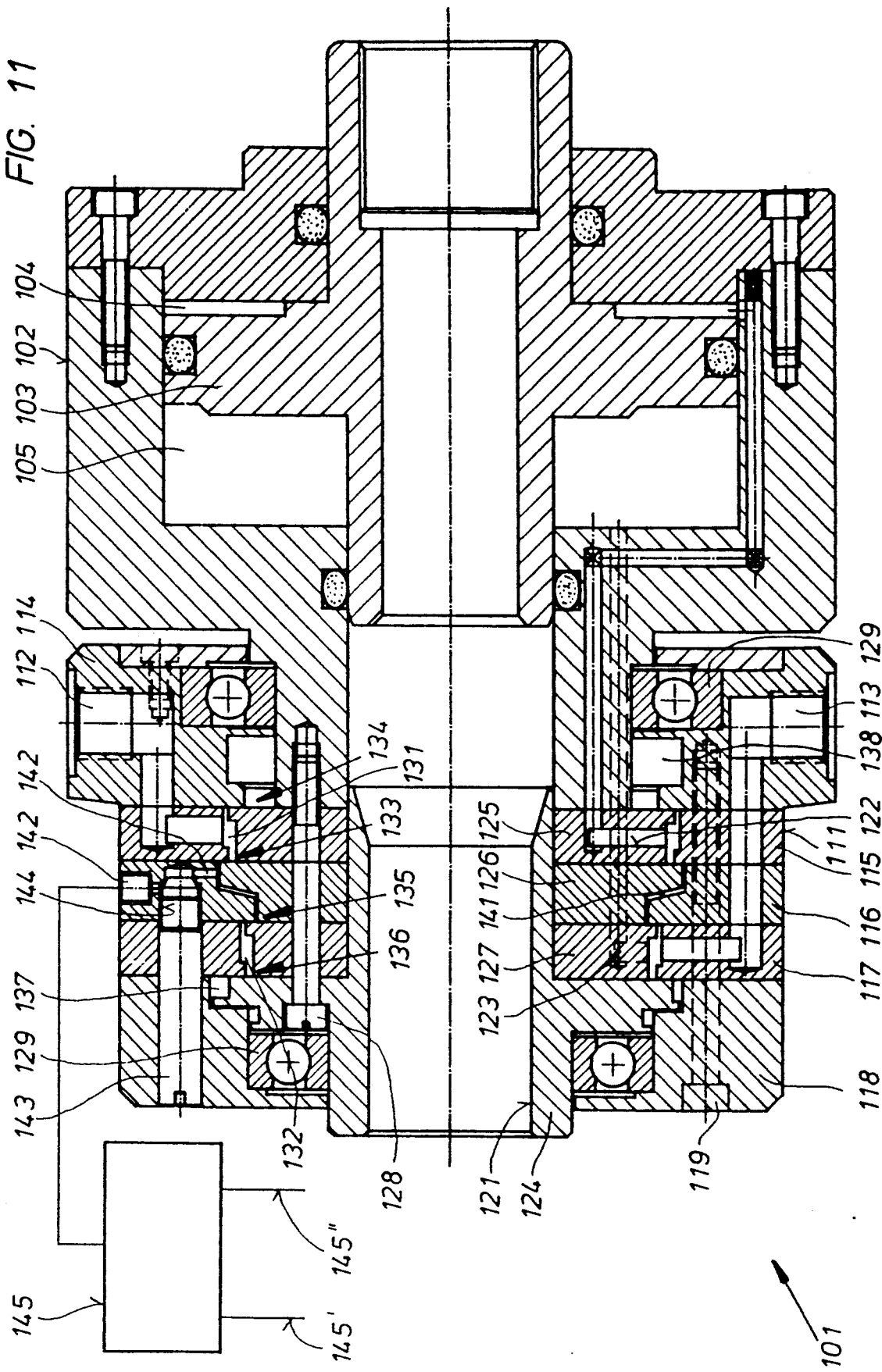
FIG. 11 is an inventive device attached to a clamping cylinder with a control chamber arranged between two annular chambers.

The device 101 represented in FIG. 11 is directly attached to a cylinder 102 in order to be able to introduce alternatingly pressure media into pressure chambers 104 and 105 of a piston 103 inserted into the cylinder 102 and loadable from both ends by the pressure medium. The device 101 is comprised of a first stationary component 111 and a second component 121 that is fixedly connected to the cylinder 102. In this embodiment, the first stationary component 111 is provided with two inlet lines 112 and 113 which open into the annular chambers 131 and 132 from where the pressure medium may be guided via the second component 121 and lines 122, 123 into the pressure chambers 104, respectively, 105.

Between the two Z-shaped annular chambers 131 and 132 a control chamber 141 is arranged to which is connected an outlet line 142 leading to a control device 145. Via a control member inserted into a threaded bore 144 the maximal allowable amount of pressure medium to be released from the control chamber 141 may be adjusted. The control member may be in the form of a control screw 143. The flow of pressure medium released from the control chamber 141 is adjusted to the respective operational conditions by a control device with an electronically controlled flow regulating valve. Via a control line 145' a respective nominal value is input by a machine control into the control member 145 and via a line 145" the thus modified amount of pressure medium is recycled into the reservoir.

When it is not desired to vary or influence the amount of pressure medium to be released by the machine control, the control screw 143 is adjusted to a certain setting. The pressure medium that is removed is then directly guided into the reservoir.

Via the sealing slots 133 and 135 adjacent to the control chamber 141 the pressure medium to be removed from the annular chambers 131, 132 may be introduced into the control chamber 141 and from there to the control member 145. The pressure medium flowing from the outer sealing slots 134 and 136 is collected within the annular chambers 137 and 138 and may be guided via non-represented lines to the reservoir.

The first component 111, in order to be assembled to form the device 101, is comprised of a bearing ring 114, three disks 115, 116, 117 and a further bearing ring 118, all parts being connected fixedly by screws 119. The second component 121 is comprised of a sleeve 124 and three disks 125, 126, 127 which are fixedly connected via screws 128 to the cylinder 102. Via roller bearings 129 the two components 111 and 121 are rotatably supported at one another. In this manner, a compact, easy to assemble and easily mountable pressure medium transfer device 101 is created.

Figure 12:
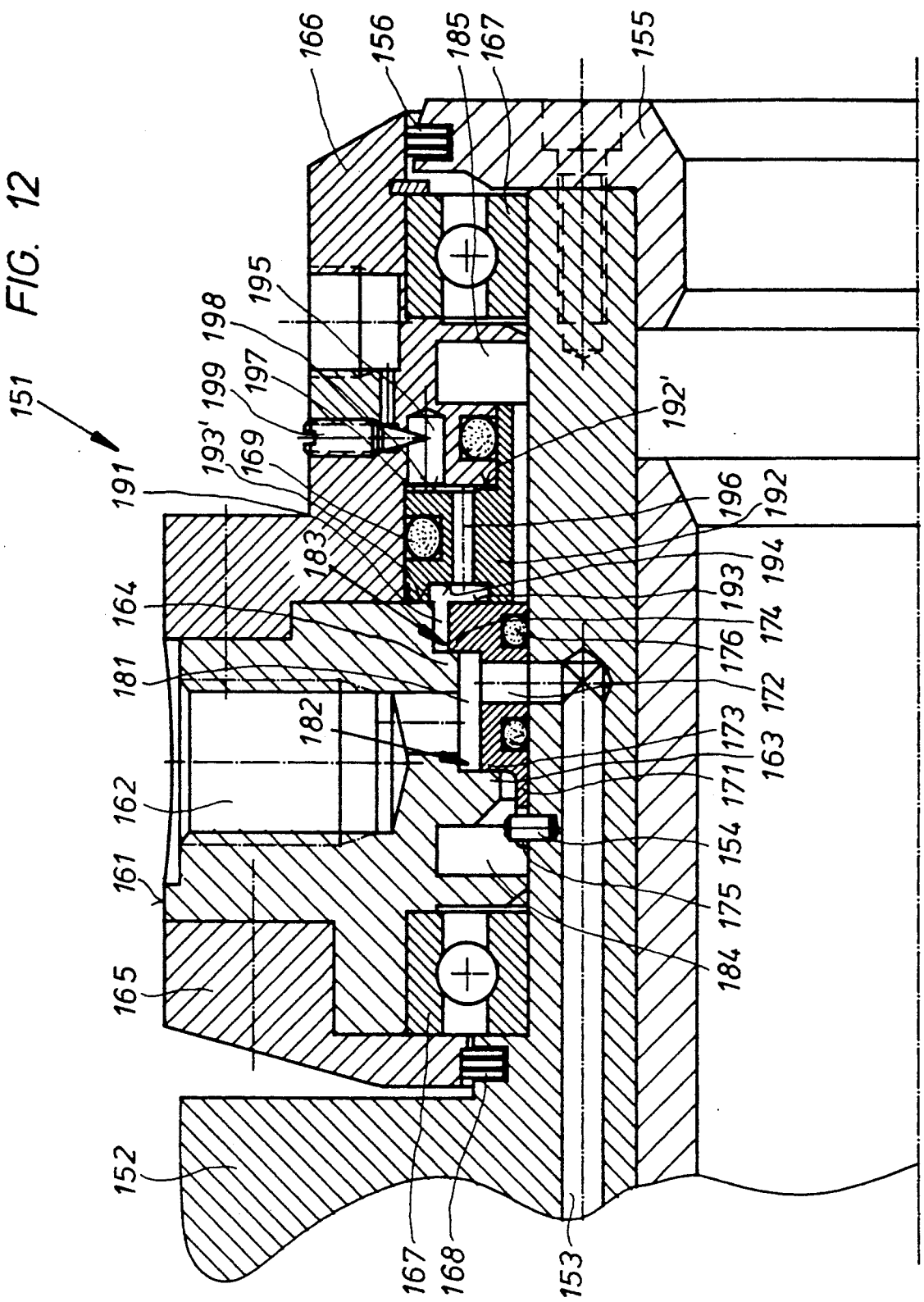
FIG. 12 is an inventive device with a control chamber of a different embodiment.

The device 151 according to FIG. 12 is comprised of a stationary first component 161 and a second component 171 connected in a rotatably fixed manner to a hub 152 of a consuming device. A control chamber 191 is connected to an annular chamber 181 arranged between the two components. The control chamber 191 is delimited by an axially adjustable piston 192. Via an outlet line 195 which is guided through the piston 192 in the form of a reducing bore 196, the amount of pressure medium flowing from the control chamber 191 is also controllable. For this purpose, a control screw 199 is provided within the outlet line 195 via which the amount of pressure medium exiting from the control chamber 191 may be adjusted.

Via a line 162 machined into the first component 161 the pressure medium to be transferred is guided to the annular chamber 181 from where it may be introduced via a line 172 provided at the second component 171 into a line 153 provided at the hub 152. The second component 171 provided with sealings 176 is rotationally fixed but axially slidable connected to the hub 152 by a pin 154 engaging a slot 175. Via fixedly connected rings 165 and 166 at the first component 161 as well as via roller bearings 167 inserted into the first component, the hub 152 is rotatably supported within the first component 161. Via labyrinth rings 168 and 156, which are directly connected to the hub 152, respectively, a cover 155 attached thereto, the device is tightly sealed.

When pressure medium is introduced into the annular chamber 181 the two sealing slots 182 and 183 are simultaneously opened as soon as a pressure has been generated within the annular chamber 181, because due to forces acting on the axially oriented surfaces of the annular chamber 181 the two components 161 and 171 are forced apart. The shoulders 163 and 173, 164 and 174 of the two components 161 and 171 which in the initial position are in contact with one another are removed from one another and pressure medium may thus flow through the sealing slots 182 and 183.

The pressure medium exiting from the sealing slot 182 is collected in the chamber 184 and recycled to a reservoir. The pressure medium exiting through the sealing slot 183 is introduced into the control chamber 191. The pressure generated within the control chamber 191 loads the faces 193 and 194 of the second component 171, which are arranged opposite one another and have large dimensions, as well as the face of the piston 192 so that the piston is moved to the right until it abuts at the abutment surface 192' at the bearing 167. Through the thus generated slot between the second component 171 and the face of the piston 192 facing the second component, the pressure medium now flows into the receiving chamber 185.

However, simultaneously pressure medium also flows via the reducing bore 196 into the pressure chamber 197 so that the pressure surfaces 198 of the piston 192 is loaded. Since the pressure surface 198 is greater than the oppositely arranged surface 194 of the piston 192 the piston is returned.

The slot between the two components 171 and the piston 192 is thus closed and due to the pressure generated within the annular chamber 191 acting on the surface 193, the second component 171 is shifted to the left and the slot width of the sealing slot 182 and 183 is reduced to its minimal value. The smallest possible slot width of the sealing slots 182, 183 is defined by contact of the abutment surface 193' of the piston 192 at the first stationary component 161.

The second component 171 as well as the piston 192 thus perform continuously opening and closing movements depending on the pressures present within the control chamber 191 and the pressure chamber 197. With the aid of the adjusting screw 199 the pressure generation within the pressure chamber 197 and within the control chamber 191 is controllable so that the amount of pressure medium exiting through the sealing slots 182 and 183 is adjustable.

Figure 13:
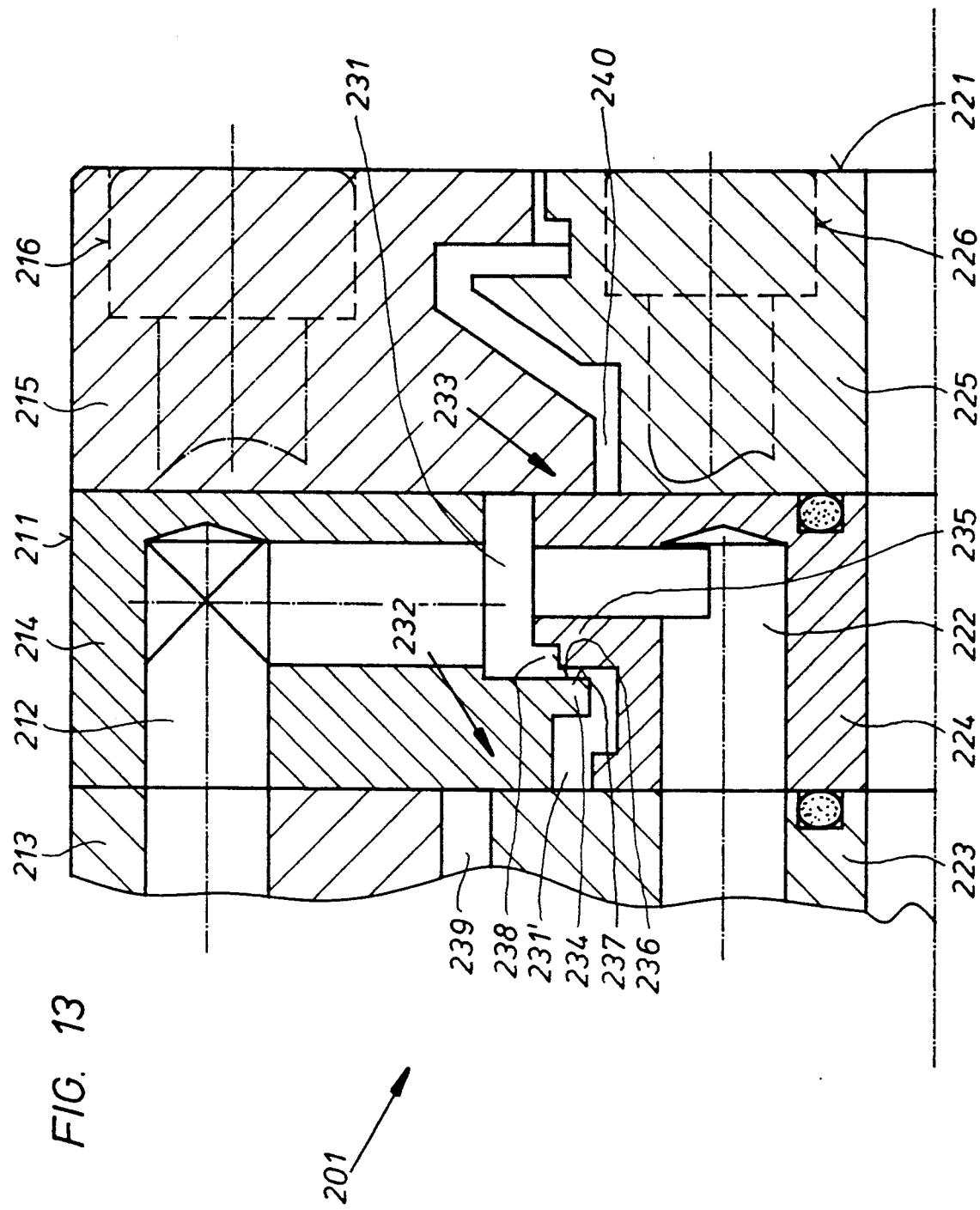
FIG. 13 shows an annular chamber with abutments for limiting the relative adjusting movement of the two components.

The device 201 according to FIG. 13 has a first component 211 comprised of three disks 213, 214, 215 and a second component 221, comprised of three disks 223, 224, 225. The three disks of each component are connected by screws 216, 226. Between the two components 211 and 221 an annular chamber 231 is provided into which the pressure medium to be transferred is introduced via a line 212 and from where it is guided to a consuming device via a line 222.

The axial adjusting movement of the two components 211 and 221 relative to one another is delimited by abutments which are arranged within the area of the annular chamber 231. The slot width of the two sealing slots 232 and 233 adjacent to the annular chamber 231 may thus be adjusted to a maximal value.

For forming cooperating abutment surfaces 236 and 237 the disk 214 is provided with a radially inwardly oriented projection 234 and the disk 215 has a shoulder 235, both projection 234 and shoulder 235 being arranged relative to another at an axial distance that corresponds to the maximum adjustable slot width of the sealing slots 232 and 233. The two components 211 and 221 thus may only be axially moved until they are contacting the abutment surfaces 236 and 237. In order to be able provide an axial adjustment the shoulder 235 is provided with a laterally open recess 238.

When pressure medium is introduced into the annular chamber 231 the two components 211 and 221 are moved apart because they are loaded within the area of the recess 238 by the pressure medium. The sealing slots 232 and 233 are almost closed. This operational stage is represented in FIG. 13. However, since within the sealing slots 232 and 233 as well as within the portion of the annular chamber 231 (indicated with reference numeral 231') a pressure is generated, the components 211 and 221 are again moved toward one another until the abutment surfaces 236 and 237 are in contact with one another. The pressure medium flows through the sealing slots 232 and 233 into the chambers 239 and 240. Due to the release of the pressure medium the pressure within the portion 231' of the annular chamber 231 is reduced and the components 211 and 221 are again pushed apart. The sealing slots 232 and 233 are thus continuously more or less closed and opened so that a self-adjustment of the slot width of the sealing slots 232 and 233 is achieved.

The present invention is, of course, in no way restricted to the specific disclosure of the specification and drawings, but also encompasses any modifications within the scope of the appended claims.

What we claim is:

1. A device for transferring a pressure medium, said device comprising:
   a first stationary component in the form of a rigid constructive unit;

a second component in the form of a rigid constructive unit, said second component inserted into said first stationary component and rotatably drivable relative to said first stationary component, with the pressure medium being transmitted from said first stationary component to said second component;

a first annular chamber defined between said first stationary component and said second component, said first annular chamber having a first and a second axial end, said first axial end delimited at least partially by said first stationary component and said second axial end delimited at least partially by said second component;

an inlet line connected to said first annular chamber;

an outlet line connected to said first annular chamber for guiding the pressure medium to a consuming device;

radially extending sealing slots defined between said first stationary component and said second component at said first and said second axial ends of said first annular chamber, said sealing slots having an adjustable slot width;

a first one of said sealing slots being delimited axially outwardly relative to said first annular chamber by said first stationary component and axially inwardly relative to said annular first chamber by said second component;

a second one of said sealing slots being delimited axially outwardly relative to said first annular chamber by said second component and axially inwardly relative to said first annular chamber by said first stationary component; and said first and said second sealing slots simultaneously adjustable into a same direction with respect to said slot width by an axial relative adjusting movement of said first stationary component and said second component.

2. A device according to claim 1, further comprising a control chamber for adjusting said slot width, said control chamber defined between said first stationary component and said second component and having two pressure surfaces arranged opposite one another in said axial direction and loaded by the pressure medium, said control chamber connected with one of said sealing slots to said first annular chamber.

3. A device according to claim 2, wherein said control chamber has a third radially extending sealing slot arranged remote from said first annular chamber, said third sealing slot simultaneously adjustable with said first and second sealing slots.

4. A device according to claim 2, wherein said first stationary component has a radially inwardly extending projection and said second component has a radially outwardly extending projection, said radially inwardly extending projection and said radially outwardly extending projection providing said control chamber with a Z-shape.

5. A device according to claim 2, further comprising a second outlet line connected to said control chamber and having an adjustable shut-off member.

6. A device according to claim 5, further comprising an axially adjustable piston for delimiting said control chamber on a side thereof remote from said first annular chamber, said piston loaded by the pressure medium and adjustable independent of said first stationary component and said second component, and further comprising abutments for limiting a stroke of said piston.

7. A device according to claim 6, wherein said second outlet line is in the form of at least one reducing bore extending through said piston, and wherein said piston further comprises a pressure surface facing away from said control chamber and loaded by the pressure medium.

8. A device according to claim 2, further comprising a second annular chamber, with said control chamber connected to said first annular chamber and said second annular chamber for alternatingly transferring the pressure medium.

9. A device according to claim 8, wherein said first and said second annular chambers are arranged mirror-symmetrical to one another.

10. A device according to claim 8, wherein said first and said second annular chambers are arranged in series.

11. A device according to claim 8, wherein said first and said second annular chambers have a Z-shape.

12. A device according to claim 2, further comprising an axially adjustable piston for delimiting said control chamber on a side thereof remote from said first annular chamber, said piston loaded by the pressure medium and adjustable independent of said first stationary component and said second component, and further comprising abutments for limiting a stroke of said piston.

13. A device according to claim 12, wherein said second outlet line is in the form of at least one reducing bore extending through said piston, and wherein said piston further comprises a pressure surface facing away from said control chamber and loaded by the pressure medium.

14. A device according to claim 1, wherein said first annular chamber has a Z-shape.

15. A device according to claim 1, wherein said first stationary component has a radially inwardly extending projection projecting into said first annular chamber and cooperating with said second component to form said second sealing slot; and wherein said second component has a radially outwardly extending projection projecting into said first annular chamber and cooperating with said first component to form said first sealing slot.

16. A device according to claim 15, wherein at least one of said radially inwardly and said radially outwardly extending projections has a radial prolongation.

17. A device according to claim 16, wherein said radially inwardly and said radially outwardly extending projections together with said radial prolongations respectively have identically dimensioned radial pressure surfaces loaded in said axial direction, said radial pressure surfaces arranged on a same diameter region of said device as said first and second sealing slots.

18. A device according to claim 15, wherein said first and second sealing slots have different lengths and are arranged on different diameter regions of said device.

19. A device according to claim 1, further comprising a bearing connected between said first stationary component and said second component for adjusting said slot width.

20. A device according to claim 1, further comprising, for adjusting said slot width, a spring for counteracting said axial relative adjusting movement, said spring supporting at least one of said first stationary component and said second component.

21. A device according to claim 1, further comprising, for adjusting said slot width, abutments for delimiting said axial relative adjusting movement.

22. A device according to claim 21, wherein a first one of said abutments is a protrusion selected from the group consisting of a lever and a pin inserted into one of said first stationary component and said second component within said first annular chamber and cooperating with a second one of said abutments at the other one of said first stationary component and said second component.

23. A device according to claim 22, wherein said second abutment is a projection.

24. A device according to claim 21, wherein a first one of said abutments is a projection connected to one of said first stationary component and said second component within said first annular chamber and cooperating with a second one of said abutments at the other one of said first stationary component and said second component, said second abutment being a shoulder, said first and said second abutments being spaced from one another at a distance that corresponds to the maximum value of said slot width.

25. A device according to claim 24, wherein said projection extends radially inwardly.

26. A device according to claim 24, wherein said projection extends radially outwardly.

27. A device according to claim 24, wherein, for generating said axial relative adjusting movement of said first stationary and said second components, said shoulder has a laterally open recess.

28. A device according to claim 1, wherein said first component is at least partially comprised of at least two disks axially adjacent connected to one another in a fixed manner.

29. A device according to claim 28, wherein said disks are connected by screws.

30. A device according to claim 1, wherein said second component is at least partially comprised of at least two disks axially adjacent connected to one another in a fixed manner.

31. A device according to claim 30, wherein said disks are connected by screws.

32. A device according to claim 1, wherein said first and said second components are at least partially comprised of at least two disks axially adjacent connected to one another in a fixed manner.

33. A device according to claim 32, wherein said disks are connected by screws.

34. A device according to claim 1, wherein at least one of said first and said second sealing slots of said annular chamber, at least on one side of said first and said second sealing slots, has a wear-resistant lining connected to one of said first stationary and said second components.

35. A device according to claim 34, wherein said lining is a ring of a ceramic material inserted into said one of said first stationary and said second component.

36. A device according to claim 3, wherein at least one of said sealing slots of said annular chamber and said sealing slot of said control chamber, at least on one side of said sealing slots, have a wear-resistant lining connected to one of said components.

37. A device according to claim 36, wherein said lining is a ring of a ceramic material inserted into said component.

38. A device according to claim 3, wherein said third sealing slot of said control chamber, at least on one side of said sealing slots, has a wear-resistant lining connected to one of said components.

39. A device according to claim 38, wherein said lining is a ring of a ceramic material inserted into said component.

* * * * *